Sept. 4, 1934.     W. E. ENGELHARD ET AL     1,972,514
LIGHTING SYSTEM FOR AUTOMOTIVE VEHICLES
Filed April 8, 1933

INVENTORS
Wm. E. Engelhard,
BY Kenneth W. Maebius
ATTORNEY

Patented Sept. 4, 1934

1,972,514

UNITED STATES PATENT OFFICE 1,972,514

LIGHTING SYSTEM FOR AUTOMOTIVE VEHICLES

William E. Engelhard, Kearny, and Kenneth W. Maebius, Wood-Ridge, N. J.

Application April 8, 1933, Serial No. 665,094

2 Claims. (Cl. 177—311)

The invention relates to the lighting system of an automotive vehicle.

It is highly desirable to insure the continuous illumination of the tail light of an automobile. It is also important that the stop light function when the brake is applied. The burning out of either one of these lights occasions trouble and delay and ofttimes leads to serious accidents. These lights being at the rear end of the car, the driver naturally is unaware of their burning out while the car is in transit.

The principal object of the present invention is to provide a means whereby the stop light will automatically function as the tail light, or vice versa if either light should burn out. Another aspect of the invention is that an audible signal will be given if the stop light should burn out.

A further object is to provide a device of extreme simplicity to accomplish the foregoing, thus making for great economies both in manufacturing, and upkeep after installation in an automotive vehicle.

A still further object is the fact that the device may be placed on an automobile with no changes in the wiring and no additional wiring, thus making for extreme ease of installation.

Other objects and advantages will become apparent as the specification proceeds. Referring to the drawing forming a part thereof:

Figure 1:
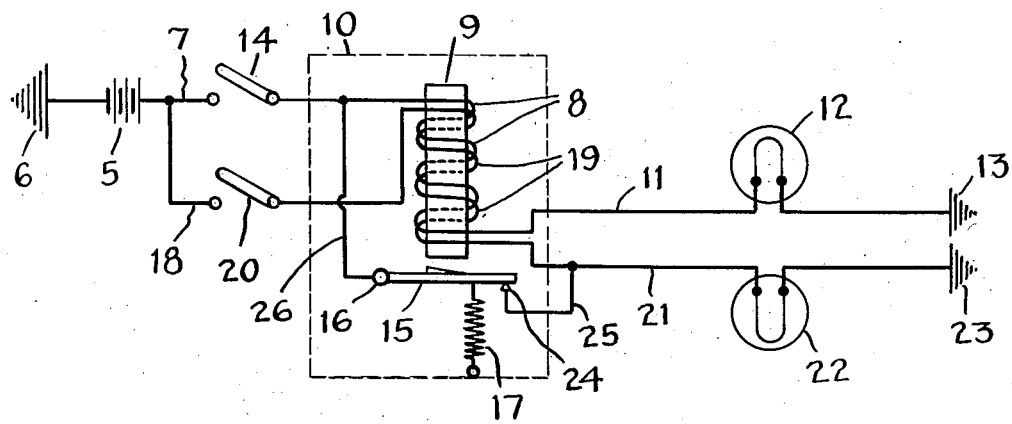
Fig. 1 is a wiring diagram illustrating one form of the invention.

Referring again to the drawing and more particularly to Fig. 1 the reference numeral 5 indicates a battery or source of electrical energy. The battery is grounded at 6 to some convenient part of the chassis as is customary in automotive vehicle wiring systems.

A lead 7 connects the battery 5 to a winding 8 on the core 9 of an electro-magnet forming part of a relay 10. Another lead 11 connects the opposite end of the winding 8 to the tail light or rear light 12 of the vehicle. The tail light 12 is grounded in the customary manner as indicated at 13. The usual tail light switch 14 is interposed in the lead 7. It will thus be apparent when the switch 14 is closed the winding 8 will be energized and the tail light 12 will be lit.

The relay 10 is provided with a pivoted armature 15 cooperating with the core 9 of the electro-magnet. When the winding 8 is energized and the tail light is lit the armature 15 will be attracted by the core 9. The armature is pivoted at 16 and a spring 17 is utilized to draw the armature away from the core when the electromagnet is deenergized.

Another lead 18 forming part of the stop light circuit is connected to the lead 7 and thence to the battery 5 and runs to a winding 19 on the core 9 of the electro-magnet. The customary stop light switch 20 is interposed in the lead 18. It will be understood this switch is operated by the brake pedal or by some other suitable mechanism on the car which will flash the stop light signal at the desired time. A lead 21 connects the opposite end of the winding 9 to the stop light 22 which is grounded in the conventional manner at 23. From an inspection of the drawing and the foregoing description it will be obvious when the stop light switch 20 is closed the winding 19 will be energized and the stop light 22 will be lit.

The relay is provided with a contact 24 which is connected by the lead 25 with the wire 21 forming part of the stop light circuit. The pivotal point 16 of the armature is connected by the wire 26 to the lead 7 forming part of the tail light circuit.

In the form of the invention illustrated in Fig. 1 the windings 8 and 19 which form the double winding of the electro-magnet are of substantially the same number of turns and wound in the same direction.

The operation of the form of the invention illustrated in Fig. 1 will now be described. As previously stated when the tail light switch 14 is closed the winding 8 will be energized, the tail light 12 lit and the armature 15 attracted. If the tail light should burn out or the tail light circuit be interrupted due to a loose connection or broken wire the winding 8 will be deenergized and the spring 17 will draw the pivoted armature 15 against the contact 17. The current will then flow through the lead 26, armature 15, lead 25 and lead 21 to the stop light. The stop light will thus remain lit and act as a tail light. Naturally when one gets out of his car and sees the stop light lit instead of the 'ail light he wll know the tail light is burned out or something wrong with the tail light circuit. Thus the condition of serious accidents happening while driving without a rear light will be eliminated. The stop light will also act to provide illumination while a person is changing the defective bulb.

When the stop light switch 20 is closed the winding 19 will be energized, the stop light 22 lit and the armature 15 attracted. Should the stop light burn out or the stop light circuit be interrupted the armature 15 will be drawn away from the core 9 and against the contact 24. The current will then pass through armature 15, lead 26, lead 7 and energize the winding 8. The winding 19 will also be energized. This will attract the armature 15 away from the contact 17 breaking the circuits to the double winding and the circuit will thus be intermittently interrupted, the armature caused to vibrate and an audible signal given to denote the failure of the stop light. The foregoing is true when the tail light is intact and the tail light switch 14 is open.

Figure 2:
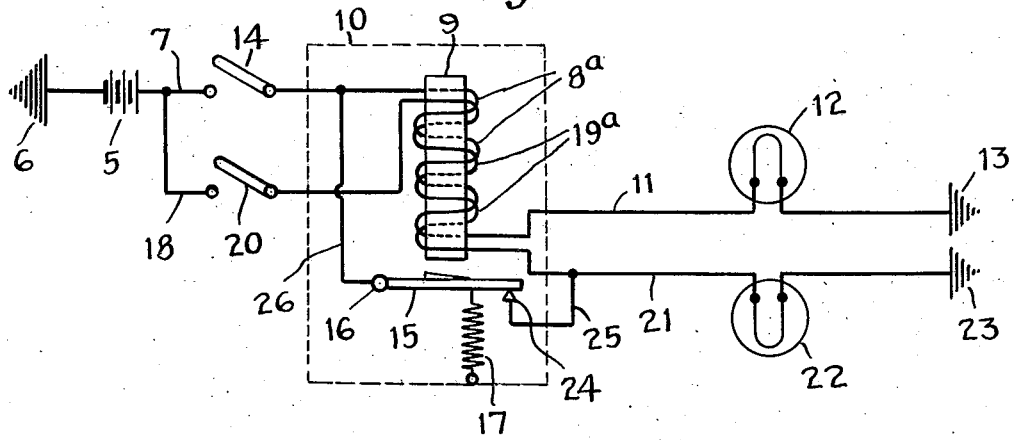
Fig. 2 is a wiring diagram illustrating a slightly different form.

In the form illustrated in Fig. 2 the same reference characters denote similar parts. Particular attention is called to the double winding of the relay in this form of the invention. The windings 8ª and 19ª are opposed to each other and run around the core 9 of the electro-magnet in opposite directions. The wiring being the same the stop light will function as in Fig. 1 to replace the tail light should the tail light burn out or the tail light circuit fail. However in the form of the invention shown in Fig. 2 the audible signal will not be given when the stop light burns out as the two windings of the electro-magnet are opposed to each other and the armature will not vibrate. When the stop light burns out the armature will be drawn away from its core and the current will pass through lead 25, armature 15, lead 26, lead 17, winding 8ª and lead 11 to the tail light. Thus when the stop light switch is closed the tail light will flash and act as a stop light.

While in the drawing the stop light and tail light are shown as separate lights, it is to be understood that the two filaments might be mounted in one bulb following the practice utilized on some of the present day cars. In this case a common ground would be employed for the two filaments.

While no provision has been made for giving a signal when both stop light and tail light are burned out an additional circuit including the dash light or a tell-tale lamp might be closed by the armature 15 so as to cause the dash light or tell-tale lamp to light or go out when both tail light and stop light do not function. However the probability of both lights burning out simultaneously is considered so remote that it is not thought necessary to illustrate this embodiment.

Such changes in detail and arrangement of parts as might be made by one skilled in the art are to be considered as coming within the spirit of the invention as set forth in the appended claims.

We claim:

1. In a lighting system for an automotive vehicle, the combination of a battery, a tail light, a stop light, a pair of switches in circuit with said battery and said lights, an electro-magnet having a double winding, one winding being connected with the tail light switch and the tail light and the other winding being connected with the stop light switch and the stop light, a pivoted armature, and a contact engageable by said armature, said contact being connected to the stop light circuit between the stop light and said electro-magnet and said armature being connected to the tail light circuit between the said tail light switch and said electro-magnet.

2. In a lighting system for an automotive vehicle the combination of a battery, a tail light, a stop light, a tail light switch in circuit with said battery and said tail light, a stop light switch in circuit with said battery and said stop light, an electro-magnet having a double winding, one winding being connected with the tail light switch and tail light and the other winding being connected with the stop light switch and stop light, a pivoted armature and a contact engageable by said armature, said contact being connected to the stop light circuit between the stop light and said electro-magnet and said armature being connected to the tail light circuit between said tail light switch and said electro-magnet, said armature being attracted by said electro-magnet when said winding in the tail light circuit is energized and the tail light is lit and moving away from said electro-magnet when said tail light burns out so as to engage said contact and close the stop light circuit, said armature being attracted by said electro-magnet when said winding in the stop light circuit is energized and said stop light is lit and intermittently attracted by the energizing and deenergizing of the winding in the tail light circuit when said tail light is intact and when said tail light switch is open so as to give an audible signal when said stop light burns out.

WILLIAM E. ENGELHARD.
KENNETH W. MAEBIUS.